Aug. 15, 1950  J. N. MATTHEWS  2,518,484
APPARATUS FOR DETERMINING THE DEPTH OF LIQUID IN TANKS
Filed Jan. 18, 1946  2 Sheets-Sheet 1

INVENTOR.
Joseph N. Matthews
BY Geo. B. Pitts
Attorney

Aug. 15, 1950     J. N. MATTHEWS     2,518,484
APPARATUS FOR DETERMINING THE DEPTH OF LIQUID IN TANKS
Filed Jan. 18, 1946     2 Sheets-Sheet 2

INVENTOR.
Joseph N. Matthews
BY Geo. B. Pitts
attorney

Patented Aug. 15, 1950

2,518,484

UNITED STATES PATENT OFFICE 2,518,484

APPARATUS FOR DETERMINING THE DEPTH OF LIQUID IN TANKS

Joseph N. Matthews, Lakewood, Ohio

Application January 18, 1946, Serial No. 641,899

3 Claims. (Cl. 73—302)

This invention relates to apparatus for ascertaining the depth of liquid selectively in a series of tanks, more particularly the ballast tanks for water on ships, whereby the ship's draft may be regulated or changed by the commanding officer to meet operating conditions, that is, where (a) the ship is being propelled without a load, fully loaded or partially loaded and/or (b) the ship's load is not properly distributed and/or (c) the body of water, through which the ship is being propelled, is calm or in varying degrees of roughness. Likewise, the ship must be trimmed to avoid engagement with equipment on wharves or piers when tying thereto or being shifted therealong. To insure efficient propulsion under these conditions it is necessary to ascertain the depth of the water in each tank or certain of the tanks, so as to determine which tanks should be supplied with additional water, the volume therein or other tanks reduced, or all of the water in the tanks withdrawn therefrom. Other conditions arise where it is highly important to quickly determine the depth of water in the tanks—certain tanks or all thereof; for example, when all or substantially all of the water is to be withdrawn, in which event the pumps must be slowed down in time to prevent the latter from pumping air, instead of water, from the tanks. Each ship, when designed has a certain cargo carrying capacity and a certain capacity for ballast, the latter to be increased or decreased as conditions require by supplying water to one or more of the ballast tanks or discharging water therefrom. Once the ballast tanks are filled, the required ballast regulation and/or draft of the ship to meet the operating conditions above referred to at any time can be determined by measuring the hydrostatic head in one or more of the tanks. My invention has been applied to a ship or boat of the ore carrying type. On ships of this type, so far as my knowledge goes, it is customary for a seaman to stand on the ship's deck and project a rod into the water in each tank (or in one or more tanks according to his orders) to measure the depth of the water therein by the water line on the rod. Aside from the fact that these operations involve an undue amount of labor and time, it is often a dangerous physical operation, due to the weather or sea conditions, and during a precipitation the rod may get wet from the rain and hence prevent a correct reading of the water line on the rod. These disadvantages in measuring the depth of water in the ship's tanks are more apparent where the ship or boat is large in size, some of which are approximately 600 feet long and contain as many as 18 tanks (9 tanks at each side of the ship holds). My invention eliminates the disadvantages above referred to on the one hand and on the other hand provides for readily taking static-head readings in all of the tanks, or selectively, as desired, at a central station, in a short period of time, whereby the trim of the ship may be quickly regulated or changed.

One object of the invention is to provide improved apparatus for determining at a single operating or central station on a ship or boat, the depth of water in any one or more of the ballast tanks provided therein.

Another object of the invention is to provide an improved apparatus for a boat wherein the hydrostatic-head of a column of the water in each tank is utilized to determine the volume or quantity of water in the tank, whereby the draft of the boat fore, mid-ship or aft may be changed.

Another object of the invention is to provide an improved apparatus arranged to utilize a fluid in a gaseous phase supplied under pressure to displace a column of water in a tank, whereby the applied pressure serves to indicate the depth of water in the tank.

Another object of the invention is to provide an improved apparatus for ascertaining the depth of liquid in a tank or like container, wherein pneumatic pressure is utilized to determine the static-head of the liquid, the applied pressure as shown on a gage, serving to indicate the depth of liquid in the tank.

Another object of the invention is to provide an improved apparatus wherein, by means of a master valve pneumatic pressure may be selectively applied to liquid in a series of tanks to measure the static-head of the liquid therein, the applied pressure to each tank being shown by a gage graduated to indicate the depth of the liquid in the tank.

A further object of the invention is to provide an improved apparatus of simple construction for readily determining the depth of water in the tanks on a boat, whereby the draft of the boat fore, aft and mid-ship may be regulated dependent on whether the boat is loaded or empty and/or existing water and weather conditions.

Another object of the invention is to provide an improved apparatus operable to determine selectively the depth of liquid in a series of tanks and automatically indicate the depth for each tank at the operating station or location and simultaneously at a remote station or location.

Another object of the invention is to provide an improved process of determining the depth of liquid in each of the ballast tanks of a ship, whereby the draft thereof may be changed in relation to the ship's load dependent on the weather and other conditions.

Another object of the invention is to provide in an improved apparatus for determining the depth of the water in the ballast tanks of a ship by the application of air under pressure, means for determining the resistance to the flow of the air to the tanks under varying atmospheric and/or barometrical conditions, whereby accuracy in determining the water depth in each tank results.

A further object of the invention is to provide an improved multi-way valve of simple construction.

Other objects of the invention will be apparent to those skilled in the art to which my invention relates from the following description taken in connection with the accompanying drawings, wherein:

Fig. 3 is a longitudinal section through the valve, substantially on the line 3—3 of Fig. 4.

Fig. 4 is a plan view of the valve.

Fig. 5 is a diagrammatic view, the valve being in section on the line 5—5 of Fig. 3.

Fig. 7 is an elevation view of a suitable manometer for use with the device.

Figure 1:
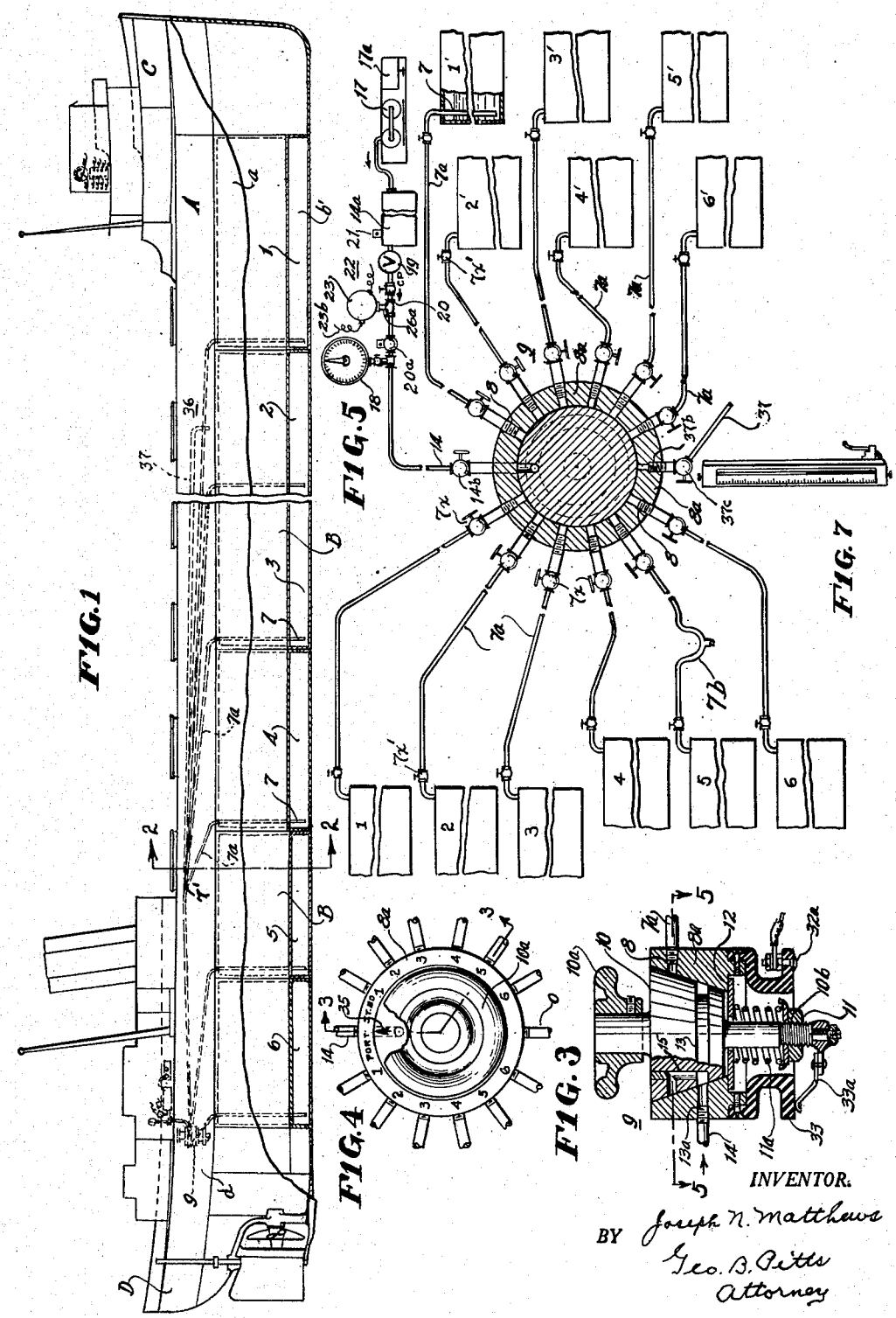
Fig. 1 is a view, partly in side elevation and partly in section on the line 1—1 of Fig. 2, of a boat equipped with apparatus embodying my invention.
Figure 2:
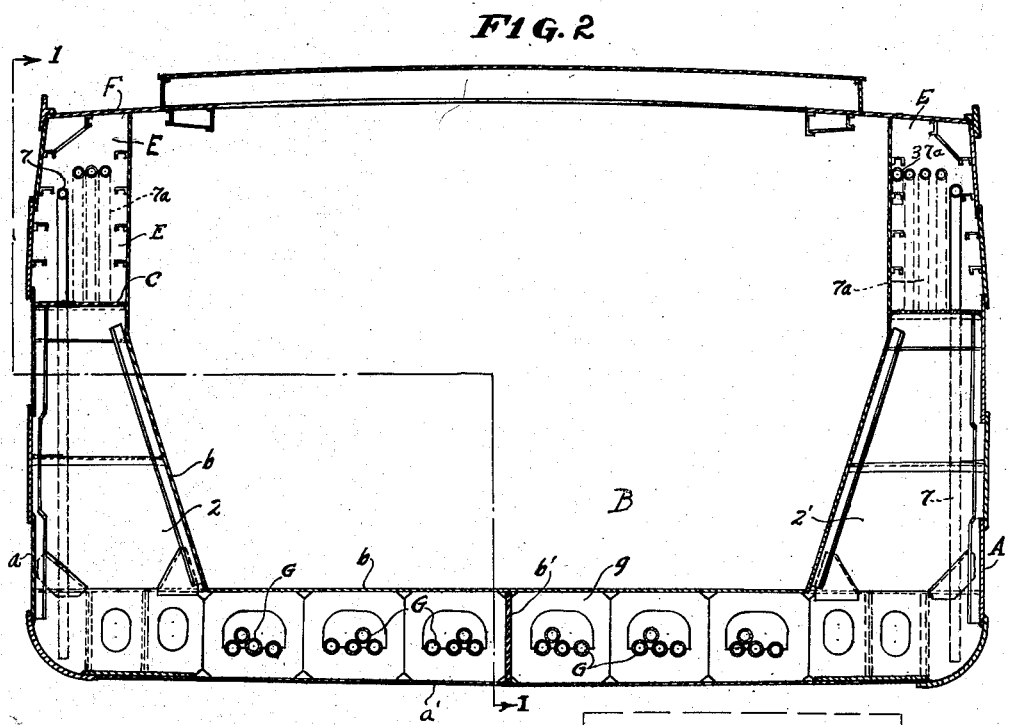
Fig. 2 is a section on the line 2—2 of Fig. 1, enlarged.

In the drawings, A indicates as an entirety a boat of the ore carrying type, which is chosen to exemplify the application of my invention, constructed to provide (a) holds B between the bow and super-structure (pilot house and officers' quarters) C and the stern D containing the engine room d and (b) tanks along the port and starboard sides of the boat, at either side of the holds B, the tanks on the port side being designated 1, 2, 3, 4, 5 and 6 and those on the starboard side being designated 1', 2', 3', 4', 5' and 6'. It will be understood that the number of tanks on each side of the boat A will depend on its length and other factors. Each tank is provided for by the outer side wall $a$ of the hull, the side and bottom walls $b$ of the adjacent hold B, the bottom wall $a'$ of the hull, a partition $b'$ disposed centrally of the hull between the bottom wall $b$ and bottom wall $a'$, and a top wall $c$, which provides a space E between it and the deck F, for a purpose later set forth. Each wall $c$ is formed with a suitable vent leading into the space E to permit escape and intake of air due to filling and emptying of the adjacent tank and discharge of air supplied to the tank in ascertaining the depth of water therein as hereinafter described. G indicates pipes extending through and supported on the reinforcing plates $g$ between the bottom walls $a'$ and $b$, these pipes being connected to one or more pumps (not shown) the operation of which serves to supply water therethrough to the tanks and draw water therefrom in maintaining or changing the trim of the boat. In the application of the invention above referred to the top walls of the tanks were approximately 23½ feet above the hull bottom wall $a'$ and when filled to the usual level the water depth was approximately 22 feet, so as to leave a space above the water level in the tanks.

7 indicates a pipe depending vertically into each tank and terminating a short distance (preferably approximately three inches) above the bottom wall $a'$. The lower or free end of each pipe 7 is open, so that the water in the adjacent tank rises and falls in the pipe corresponding to that in the tank incident to the supply of water to the tank or withdrawal of water therefrom. The upper end of each pipe 7 is connected to one end of a pipe 7a preferably leading through the adjacent space E and connected at its opposite end to a port 8 formed in the casing 8a of a master valve 9, which is located at an operating station, such as the engine room $d$. As will be understood from Fig. 5, the valve casing 8a is formed with a plurality of ports 8, corresponding to the number of tanks, each pipe 7a being connected to one of these ports. By preference, as shown in Fig. 1, intermediate portions of the pipes 7a (except the pipes related to tanks 6 and 6') between the tanks and valve 9 are extended upwardly, as shown at 7', to permit gravitation of condensation of moisture in the pipes. In this arrangement condensation in one portion of each pipe 7a drains back into the adjacent pipe 7 and condensation in the other portion drains into a collector 7b, preferably consisting of a U-section (one only being shown) interposed in the pipe 7a in close relation to and at a level below the valve 9. The bottom portion of the U-section 7b is provided with a discharge opening which is sealed closed by a screw plug.

The inner wall of the valve casing 8a is of conical shape to form a seat for the valve element 10 having at one side a device (preferably a wheel) 10a for turning it and at its opposite end a shank 10b. The outer end portion of the shank 10b is provided with screw threads to take a nut 11. The nut 11 serves as an abutment for the outer end of a spring 11a coiled around the shank 10b; the inner end of the spring 11a engages an annular plate 12 seated on the valve casing 8a. In this arrangement the spring 11a cooperates with the nut 11 and plate 12 to yieldably maintain the valve element 10 in its seat in the casing 8a. The side wall of the valve element 10 is formed with an annular recess 13 which registers with the inner end of an inlet port 13a formed in the valve casing 8a. The outer end of the port 13a is connected to a conduit 14, to which a fluid in the gaseous phase (preferably air) under pressure is supplied from a reservoir 14a. At one side of the recess 13, the valve element is formed with a duct 15 having a vertical portion connected with the recess 13 and an outwardly extending portion arranged to register with each of the ports 8, whereby by rotation of the valve element 10, air under pressure is supplied from the conduit 14 to each of the ports 8 according to the angular position of the valve element. As the valve element 10 is provided with only one duct 15, all of the ports 8 are closed when the valve element is in neutral position (see Fig. 5) and when the valve element is rotated to connect the duct 15 with any one of the ports 8 all of the remaining ports are closed. The air under pressure may be supplied to the reservoir 14a from any suitable source; that is, a compressor on board the boat and forming part of its equipment and connected to the reservoir 14a or from a suitable pump 17 connected to the reservoir and driven by a suitable motor 17a (the pump and motor being shown diagrammatically). The air in the reservoir 14a is preferably maintained at approximately 25 pounds pressure. Each pipe 7a is provided adjacent the valve 9 with a cut-off 7x, adapted to be closed when repairs are needed and also set in adjusted position when tests or readings are made, as later set forth, to determine the back pressure or resistance to air flow in each of the pipes 7a (including each pipe 7, if the ballast tanks are empty) due to friction of the air flowing therethrough. 18 indicates a suitable gage connected to the conduit 14 for registering the pressure when a reading for each tank is made, either with respect to the resistance to air flow or static-head in the pipes 7. 19 indicates a suitable adjustable constant pressure valve interposed in the conduit 14 between the air reservoir 14a and the gage 18. 20 indicates an adjustable valve in the pipe 14 between the valve 19 and the gage 18. The valve 19 is preferably set to supply air to the conduit 14 at approximately 10 pounds pressure, whereas the valve 20 is adjusted to permit the flow of approximately 2 cubic feet of air per minute through the conduit 14. The valve 20 is adjustable to provide sufficient air flow to each pipe 7 when air pressure communication is established therewith to enable a quick reading in each operation of the valve 9. 20a indicates a safety valve connected to the conduit 14 and adapted to relieve excess pressure therein, that is, pressure above the limit provided for by the gage 18, to avoid damage to the latter. 21 indicates a suitable safety valve mounted on the top wall of the reservoir 14a. 14b indicates a cut-off provided in the conduit 14 adjacent the valve 9 to close the latter when it is found necessary to inspect or repair the valve or other parts of the system.

As will be understood, the pipe 7 in each ballast tank provides a column of water substantially equal in depth to that in the adjacent tank at all times (except as hereinafter set forth), so that by displacing the water in the pipe by the application thereto of air under pressure, the pressure, which is required for such displacement, as indicated on the gage, will equal the static-head of the volume of water in the pipe and this pressure in turn, in connection with the computations later referred to, is utilized to indicate the depth of the water in the tank. Accordingly, by rotation of the valve element 10 to effect communication between the reservoir 14a and the pipe 7 in each tank or any selected tank or tanks, the depth of the water therein may be determined. The gage 18 may be graduated to indicate the volume of water in each tank, the hydrostatic-head of the water or its depth. By preference, the gage 18 is graduated to indicate the depth of the water in the pipe measured in feet and inches.

The gage 18 shown in Fig. 5 is of the graduated dial type, but other forms of gages may be employed, such as a manometer shown in Fig. 7.

In operation of my apparatus the first step is to determine the back pressure due to frictional resistance of the pipes 7a to the flow of the air therethrough and to set the valves 7x in operating position, so that by the supply of the air pressure to the pipes 7 the depth of water in the tanks may be accurately determined. This step is carried out under the conditions already referred to (that is, with all of the tanks empty or with the boat on an even keel and the tanks filled to the same level) by first opening all of the valves 7x and operating the valve 9 to connect the conduit 14 to the pipe 7a related to one of the tanks (1 or 1') most remote from the valve 9 (the valves 7x for the pipes 7a leading to the tanks 1, 1', being fully open) and noting the back pressure as shown by the gage 18 in lineal dimensions. The valve 9 is then operated to connect the conduit 14 with each of the tanks 2 to 6 and 2' to 6', respectively, and each valve 7x related thereto is then adjusted so that the back pressure resistance for the adjacent pipe 7a as shown by the gage 18 in lineal dimensions is equal to the back pressure first noted with respect to the remote tank. By preference each valve 7x is then sealed against tampering by a section of wire and a suitable lead slug (not shown). With the valves 7x in adjusted position, the apparatus is conditioned for making depth readings, from time to time, which step or operation consists in operating the valve 9 to establish communication from the air supply conduit 14 through the pipe 7a to the pipe 7 for each tank or selectively certain of the tanks dependent on the ship's load and/or the prevailing weather conditions, such as hereinbefore referred to. As the hand for the gage 18 revolves relative to its zero position (as shown in Fig. 5) in each operation of the valve 9 to connect the conduit 14 with one of the pipes 7a, (a) the above noted lineal measurements must be deducted from the total lineal measurement indicated on the gage 18 and (b) to this difference or remainder must be added a lineal dimension equal to the spacing of the lower end of the adjacent pipe 7 from the bottom a' of the tank to correctly determine the depth of water in the adjacent tank; this last referred to dimension being three inches according to the present disclosure. However, where the operating conditions under which the boat is being propelled make it unnecessary to determine the exact water depth in one or more tanks, the dimensional deduction and addition above referred to are not made with respect to the depth indicated by the gage 18. Each operation serves (a) to displace the water in the pipe 7 of each tank of which a depth reading is made, the pressure required for such displacement being indicated on the gage 18, which being graduated in feet and inches, exhibits the depth of the water in each pipe 7 and enables the commanding officer to determine the depth of the water in the tanks and order water supplied to or withdrawn from the tank or tanks of which a depth reading was made, and (b) charges each of said pipes 7a and the adjacent pipe 7 with air under pressure, whereby subsequent readings are quickly effected. In making each reading, the arm of the gage 18 revolves about its axis and comes to a stop, when all of the water in the adjacent pipe 7 is displaced, which position of stoppage indicates the static-head or displacement pressure. It will be observed that when the operating device 10a is in neutral position (see Figs. 4 and 5), the valve 9 cuts off the supply of air to all of the pipes 7a; also, when the valve element is rotated to connect the conduit 14 with each pipe 7a, the supply of air to all of the remaining pipes 7a is cut off. Accordingly, it follows that, in displacing the water in each pipe 7, the pipes 7a and the pipes 7 connected thereto, respectively, are charged with air under pressure, so that in operating the valve 9 to make a subsequent reading of the water depth in each pipe the time required for the supplied air pressure to flow to the adjacent pipe 7 and displace the water therein is eliminated. It will thus be seen that the valve 9 may be readily rotated from one operating position to another operating position and all of the pipe readings quickly made. If prior to a subsequent reading of a tank water has been supplied thereto, the static-head resulting from such supply will cause a rise of the water in the adjacent pipe 7 and compression of the air therein; and upon making the subsequent reading the supplied air pressure, in addition to the pressure in the pipe previously utilized, to displace the water therein, will be indicated on the gage by movement of the gage arm to a higher point or graduation. If prior to a subsequent depth reading of a pipe a portion of the water in the adjacent tank has been withdrawn therefrom, the reduced static-head in the tank will permit escape of air from the adjacent pipe 7 to equalize its pressure and the then existing static-head, but upon making the subsequent reading the applied air pressure corresponding to the static-head of the water in the pipe will be indicated by the gage 18.

$7x'$ indicates a supplemental cut-off provided in each pipe $7a$ in close relation to the adjacent tank, whereby air flow to the latter may be cut off when the tank is to be inspected or its walls repaired, to avoid closing and re-setting of the adjacent valve $7x$.

Figure 6:
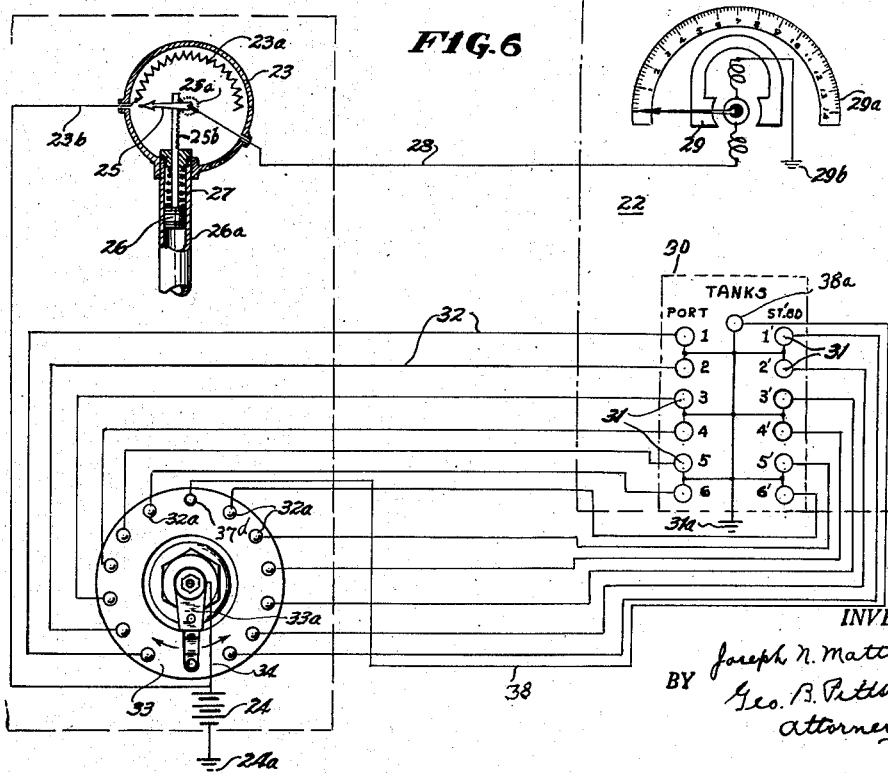
Fig. 6 is a diagrammatic view showing the system for indicating the depth of the water in the respective tanks at a remote location.

Means, indicated as an entirety at 22, are provided for simultaneously indicating at a control station (for example—the pilot house), remote from the operating station, the reading for each tank each time a depth reading is made. The means 22 herein shown is of the electrical type and consists of the following: 23 indicates a casing mounted on the wall of the engine room. The casing encloses an arc shaped resistance $23a$ one end of which is connected to a lead $23b$, the lead in turn being connected to the positive side of a suitable battery 24, having its negative side grounded at $24a$. The walls of the casing 23 support a shaft carrying an arm 25 arranged to engage the resistance $23a$ and movable from end to end thereof. The shaft for the arm 25 has fixed to it a gear $25a$ engaged by a ratchet $25b$, the lower end of which is provided with a piston 26 reciprocatable in a cylinder $26a$. As shown in Fig. 5, the cylinder $26a$ is connected to the conduit 14, so that when the valve 9 is operated to measure the depth of the water in each of the pipes 7 the pressure operates the gage 18 and simultaneously forces the piston 26 upwardly, whereby the arm 25 is revolved relative to the resistance $23a$. A spring 27 is interposed between the end wall of the cylinder $26a$ and piston 26 and normally operates to bias the latter downwardly to swing the arm 25 to zero position as shown in Fig. 6. The arm 25 is connected through a lead 28 to one side of a suitable electrically operated gage 29 having a scale $29a$ graduated similarly to the scale for the gage 18. The opposite side of the gage 29 is grounded at $29b$. The resistance $23a$ is constructed to control the current to the gage 29, so that in each operation of the valve 9 the arm $29b$ thereof swings relative to the scale $29a$ a distance equal to the movement of the arm for the gage 18. 30 indicates a panel associated with the gage 29 and mounting a series of lamps 31, one lamp for each ballast tank, one side of the lamps being grounded at $31a$. The other sides of the lamps 31 are connected by leads 32 (one for each lamp) to contacts $32a$, respectively, mounted on an annular collar 33 (see Fig. 3) formed of insulating material and suitably fixed to the inner end of the valve casing $8a$. The outer end of the shank $10b$ for the valve element 10 is provided with an arm $33a$ connected by a lead 34 with the battery 24, the arm being suitably insulated from the shank $10b$. The outer end of the arm $33a$ is arranged to engage the contacts $32a$ when the valve element 10 is rotated. The arm $33a$ is fixed to the shank $10b$ in alinement with the duct 15 and the contacts $32a$ are alined with the ports 8, respectively, whereby operation of the wheel $10a$ to supply air pressure to each of the pipes 7 will insure closing of the circuit for the lamp corresponding to the tank in which each pipe is mounted. In operation, assuming that the depth of tank 4 is to be determined, the valve element 10 is turned counter-clockwise, as viewed in Fig. 4 (clockwise as viewed in Fig. 6) from neutral position until duct 15 registers with the port 8 related to pipe $7a$, which is connected to pipe 7 of ballast tank 4; in this movement of the valve element 10, the arm $33a$ sweeps over the contacts related to the lamps corresponding to tanks 1, 2, and 3, momentarily lighting these lamps and comes to rest on the contact related to the lamp corresponding to tank 4, which lamp remains lighted while the depth of tank 4 is determined and notifies the officer in the pilot house which tank is being tested, whereas the gage 29 exhibits in lineal dimensions the static-head in pipe 7 of the tank, whereby the depth of water in the latter can be determined as already set forth.

The operating device $10a$ is preferably provided with an arrow 35 in alined relation to the duct 15. The arrow 35 serves as a guide for the operative to indicate the position of the duct 15 when the device $10a$ is being operated.

It will be observed that in setting the valves $7x$, as already set forth, they were adjusted in relation to the pressure due to resistance to air flow in the pipes $7a$ under the atmospheric (humidity) or barometrical conditions existing at that time. Where a change in these conditions takes place, the resistance to air flow in the pipes $7a$ is increased or decreased, so that it is necessary, at the time any depth readings are to be made, to determine the air pressure required to overcome the resistance in the pipes $7a$ to air flow, and deduct the lineal measurement corresponding to this pressure from that indicated by the gage 18 for each depth reading, whereby the latter may be accurately determined. To avoid the time and labor required to re-set the valves $7x$, I provide auxiliary means, indicated as an entirety at 36, for determining from time to time the approximate pressure measurement to overcome the resistance to air flow in the pipes $7a$, so that such measurement (instead of the initial dimension noted) may be noted and deducted from that indicated by the gage 18, as already set forth. The means 36 consist of a pipe 37 extending through one of the spaces E, its outer end preferably terminating in one of the intermediate tanks at one side of the holds B. The inner end of the pipe 37 is connected to a port $37b$ formed in the valve casing $8a$ in line with the ports 8, whereby the valve element 10 of the valve 9 may be rotated to connect the conduit 14 with the pipe 37 and supply air to the latter. $37c$ indicates a valve provided in the pipe $37a$ adjacent to the valve 9, the valve $37c$ being adjusted at the time the valves $7x$ were adjusted to regulate the air flow therethrough corresponding to that of the pipe $7a$ related to the most remote tank 1 or $1'$. As shown, the pipe 37 and the valve $37c$ therefor are of the same size as the pipes $7a$ and their valves $7x$.

respectively, to insure a correct reading in relation to the initial reading hereinbefore set forth.

The pipe 37 is open at its outer end and of sufficient length so that when a test reading thereof is made, the pressure shown by the gage 18 will approximate the resistance for all of the pipes 7a. The pipe 37 preferably terminates adjacent one of the intermediate ballast tanks so that the indicated resistance will approximate that of the pipes 7a related to those tanks more remote from and closer to the valve 9. When the valve element 10 is rotated to connect the conduit 14 with the port 37b, the arm 33a engages a contact 37d, closing the circuit through the gage 29 and through a lead 38, which is connected to a lamp 38a, grounded at 31a, whereby the pressure due to air flow resistance in the pipe 37 is exhibited at the station in the pilot house and such pressure reading is indicated by the lighting of the lamp 38a.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What is claimed is:

1. In a system for determining at an operating station the liquid levels in the ballast tanks of a ship consisting of a plurality of pipes each depending vertically in one of the ballast tanks to a position adjacent the bottom thereof, each said pipe terminating with an unobstructed open end to permit the rise and fall therein of the liquid in the adjacent tank, a unitary rotary valve mechanism at the operating station provided with an inlet port and a plurality of outlet ports, one corresponding to each of the ballast tanks, a source of supply for a gaseous medium under pressure, a conduit connecting said source of gaseous medium supply to the inlet port of said valve mechanism, a separate pipe between each of said outlet ports of said valve mechanism and the upper end of one of said vertically disposed depending pipes, the plurality of pipes comprising respectively connected separate and depending pipes, including some substantially different in combined length, the rotatable valve element of said valve mechanism being operable to selectively establish communication between said conduit and each of said separate pipes to permit flow of the gaseous medium therethrough to the adjacent vertically disposed depending pipe, the supply of the gaseous medium to each said depending pipe serving to displace all of the liquid therein, adjustable flow restricting means in each separate pipe for initially equalizing the frictional resistance to flow through said separate and depending pipes, and a gage connected with said conduit for indicating the applied pressure for displacing the liquid from each depending pipe.

2. An apparatus as claimed in claim 1 wherein is provided a regulating valve between said source of gaseous medium supply and said gage for controlling the pressure of the gaseous medium in the system and a pressure relief valve is provided in said conduit between said regulating valve and said valve mechanism.

3. In a system for determining the liquid levels in a row of ballast tanks of a ship at an operating station located adjacent one end of said row, consisting of a source of supply for a gaseous medium under pressure, a rotary valve mechanism at the operating station and provided with an inlet port and a plurality of outlet ports, one for each tank, a conduit connecting said source of gaseous medium supply to the inlet port of said valve mechanism, a plurality of pipes connected at their inner ends to said outlet ports, respectively, each pipe consisting of a main section and a terminating discharge section, each of said discharge sections depending vertically through the top wall of one of said tanks and terminating with an unobstructed open end at a level adjacent the bottom thereof, the rotatable element of said valve mechanism being operable to selectively establish communication between said conduit and each of said pipes to permit flow of the gaseous medium therethrough to the adjacent depending pipe discharge section, the supply of the gaseous medium to each said depending pipe discharge section serving to displace all of the liquid therein, adjustable flow restricting means in each of said pipes adjacent said valve mechanism for initially equalizing the frictional resistance to flow therethrough, and a gage in said conduit for indicating the applied pressure for displacing the liquid from each of said depending pipe discharge sections.

JOSEPH N. MATTHEWS.

REFERENCES CITED

The following references are of record in the file of this patent:

UNITED STATES PATENTS

| Number | Name | Date |
| --- | --- | --- |
| 804,570 | Wheeler | Nov. 14, 1905 |
| 1,100,867 | Dexter | June 23, 1914 |
| 1,172,650 | Walton | Feb. 22, 1916 |
| 1,900,775 | Star | Mar. 7, 1933 |
| 2,328,954 | Conley | Sept. 7, 1943 |
| 2,384,618 | Hebeler | Sept. 11, 1945 |

FOREIGN PATENTS

| Number | Country | Date |
| --- | --- | --- |
| 118,729 | Austria | Aug. 11, 1930 |
| 140,546 | Great Britain | Apr. 1, 1920 |
| 150,349 | Great Britain | Sept. 22, 1921 |
| 304,717 | Germany | Apr. 3, 1918 |
| 490,248 | Great Britain | Aug. 11, 1938 |
| 662,939 | France | Mar. 29, 1929 |